United States Patent [19]

Uku et al.

[11] Patent Number: 5,378,786
[45] Date of Patent: Jan. 3, 1995

[54] SPHERICAL VINYL CHLORIDE GRANULES FOR PASTE MOLDING

[75] Inventors: Kyoji Uku; Masahiro Ueda; Tetsuya Murakami; Norio Hirokawa, all of Hyogo, Japan

[73] Assignee: Kanegafuchi Kagaku Kogyo Kabushiki Kaisha, Osaka, Japan

[21] Appl. No.: 987,238

[22] Filed: Dec. 7, 1992

Related U.S. Application Data

[60] Continuation of Ser. No. 694,608, May 2, 1991, abandoned, which is a division of Ser. No. 433,292, Nov. 9, 1989, abandoned.

[30] Foreign Application Priority Data

Nov. 14, 1988 [JP] Japan ................... 63-288604
Nov. 14, 1988 [JP] Japan ................... 63-288605
Nov. 14, 1988 [JP] Japan ................... 63-288606
Nov. 14, 1988 [JP] Japan ................... 63-288607
Nov. 14, 1988 [JP] Japan ................... 63-288608

[51] Int. Cl.$^6$ ................................ C08F 14/06
[52] U.S. Cl. ........................... 526/344.2; 526/345; 528/502
[58] Field of Search ................ 526/344.2, 345

[56] References Cited

U.S. PATENT DOCUMENTS

| | | | |
|---|---|---|---|
| 3,578,649 | 5/1971 | Badguerahanian et al. | 526/909 |
| 3,624,051 | 11/1971 | Bauer | 526/344.2 |
| 3,692,718 | 9/1972 | Golstein | 526/344.1 |
| 3,926,931 | 12/1975 | Koyanagi | 526/344.2 |
| 3,933,771 | 1/1976 | Eastman et al. | 526/345 |
| 4,002,702 | 1/1977 | Kuhn . | |
| 4,324,878 | 4/1982 | Biaggi et al. | 526/200 |
| 4,607,058 | 8/1986 | Hong | 526/344.2 |
| 4,668,707 | 5/1987 | Hawrylko | 526/344.2 |

FOREIGN PATENT DOCUMENTS

| | | |
|---|---|---|
| 2492388 | 4/1982 | France . |
| 2257182 | 5/1973 | Germany . |
| 130259 | 5/1978 | Germany . |
| 3443800 | 6/1985 | Germany . |
| 3602821 | 8/1986 | Germany . |
| 256801 | 5/1988 | Germany . |
| 385107 | 2/1965 | Switzerland . |

OTHER PUBLICATIONS

Database WPIL, Abstract No. 85-193487, Derwent Publications, Ltd., London, GB.
Database WPIL, Abstract No. 87-046821, Derwent Publications, Ltd., London, GB.

*Primary Examiner*—Christopher Henderson
*Attorney, Agent, or Firm*—Armstrong, Westerman, Hattori, McLeland & Naughton

[57] ABSTRACT

Spherical vinyl chloride resin granules and a process for producing the same are disclosed. The granules exhibit excellent particle characteristics and sol-forming properties and are therefore useful as resins for paste.

1 Claim, 1 Drawing Sheet

SPHERICAL VINYL CHLORIDE GRANULES FOR PASTE MOLDING

This application is a continuation of application Ser. No. 07/694,608, filed May 2, 1991, now abandoned, which was a division of application Ser. No. 433,292, filed Nov. 9, 1989, now abandoned.

FIELD OF THE INVENTION

This invention relates to spherical vinyl chloride resin granules prepared from an aqueous dispersion of a vinyl chloride resin which is obtained by suspension polymerization or emulsion polymerization and to a process for producing the same.

BACKGROUND OF THE INVENTION

Vinyl chloride resin granules which have conventionally been employed are produced by suspension polymerization or emulsion polymerization of vinyl chloride or a vinyl chloride-based monomer mixture in the presence of a surface active agent to obtain an aqueous resin dispersion, followed by granulation by spray drying of the aqueous resin dispersion.

Where the vinyl chloride resin granules are used for, e.g., preparing paste, the granules are mixed with a plasticizer to form a sol (called sol formation), and the resulting sol (paste) is molded and hardened by heating (called gelation) to obtain a final cured product. If the vinyl chloride resin granules have insufficient sol-forming properties or if the sol contains large particles which remain undispersed, the workability in paste molding is deteriorated or the properties of the final product are degraded. Thus, in sol formation, the vinyl chloride resin used have been finely ground. Therefore, the particle shape of the vinyl chloride resin has been considered to have no direct influence on the final product after they have been ground for preparing paste and has received very little attention.

However, as a result of studies on the shape of vinyl chloride resin particles, the inventors have found that particles of various irregular shapes, e.g., hollow particles with large holes and broken hollow particles, do not necessarily have satisfactory particle characteristics, such as flow characteristics. Moreover, these particles have a low bulk specific gravity, a small weight per unit volume, and thus have an increased cost of transportation.

Further, a vinyl chloride resin having been finely ground for preparing paste causes dusting when bags of the resin are opened and affect the working environment and cannot be automatically weighed and fed.

In order to solve the above-described problems, attempts have been made to obtain a granular vinyl chloride resin which can be used for preparing paste without requiring fine grinding. For example, it has been proposed to lower the temperature of drying air at the time of feeding and spraying in the spray drying of the aqueous resin dispersion to obtain granules having excellent particle characteristics and satisfactory sol-forming properties as disclosed in JP-B-57-5815 (the term "JP-B" as used herein means an "examined Japanese patent publication") and JP-A-60-120726 (the term "JP-A" as used herein means an "unexamined published Japanese patent application").

However, reduction of the drying air temperature reduces the drying rate, resulting in an increase in the water content remaining in the granules. A gel obtained from a sol prepared from granules having a high residual water content provide molded articles having poor surface properties.

When the average particle size of the granules is controlled to be as small as about 20 μm as suggested in JP-B-57-5815, the drying rate is improved, and the residual water content can be decreased but, in turn, the particle characteristics are deteriorated. On the other hand, when the average particle size is controlled to be as large as about 80 to 100 μm as suggested in JP-A-60-120726, the particle characteristics are improved, but the residual water content becomes higher, and requires an extra drying step.

Further, these processes of granulation still involve a problem that the sol contains a large number of undispersed granules. In addition, sol-forming properties of the granules are further reduced during storage, and the proportion of the undispersed granules in the resulting sol is increased, ultimately becoming unsuitable for use in paste molding.

To prevent reduction of sol-forming properties, it has been proposed to add glycol ethers or nonionic surface active agents as disclosed in F. Ponizil, *Kunststoffe*, Vol. 64, p. 3 (1974). These additives, however, sometimes deteriorate quality of the final products and are, therefore, unsuitable for general use.

SUMMARY OF THE INVENTION

One object of the present invention is to provide vinyl chloride resin granules, particularly for preparing paste thereof, which exhibit excellent particle characteristics and improved sol-forming properties.

Another object of this invention is to provide vinyl chloride resin granules which do not cause dusting during handling and can be used with automatic weighing and feeding.

A further object of this invention is to provide vinyl chloride resin granules having improved preservability.

A still further object of this invention is to provide a process for producing the above-described vinyl chloride resin granules.

The inventors have conducted extensive studies and, as a result, have found that the above objects of this invention are accomplished by spherical vinyl chloride resin granules, preferably having a specific particle size distribution. It has also been found that excellent granular vinyl chloride resin for preparing paste can be produced by drying and granulating an aqueous dispersion of a vinyl chloride resin in a spray dryer under specific conditions. It has further been ascertained that if granules being spray dried adhere onto the inner wall of the spray dryer and are exposed to heat for a long time while adhered to the wall, the proportion of undispersed granules in the sol formed is increased and that reduction of such adhesion of the granules onto the inner wall of the dryer leads to the production of vinyl chloride resin granules for paste molding which have excellent sol-forming properties and provide a sol having a reduced proportion of undispersed granules.

That is, this invention relates to spherical vinyl chloride resin granules.

This invention further relates to a process for producing vinyl chloride resin granules for preparing paste which comprises drying and granulating an aqueous dispersion of a vinyl chloride resin for paste molding in a spray dryer using drying air having an absolute humidity of from 0.008 to 0.012 kg/kg and a temperature of not higher than 100° C. at the inlet and not higher than 50° C. at the outlet to obtain granules having a water content of from 0.1 to 0.5% by weight and an average particle size of from 30 to 100 μm.

Since the resin granules according to the present invention are spherical granules obtained without grinding, they roll, or flow, easily and exhibit satisfactory particle characteristics exemplified by an angle of repose. Because the granules are not finely ground, the proportion of fine powders that can cause impairment of a working environment through dusting when a bag is opened is reduced. According to the process of the present invention which is carried out under specific conditions, the resulting granules have satisfactory sol-forming properties.

DETAILED DESCRIPTION OF THE INVENTION

The terminology "spherical granules" as used herein embraces not only true spheres but spheroid having a longer axis/shorter axis ratio of about 1.1 or less as well as somewhat deformed true spheres or spheroid.

The terminology "granules" as used herein means an agglomeration of vinyl chloride resin dispersed in an aqueous dispersion.

The vinyl chloride resin constituting the spherical vinyl chloride resin granules of the present invention is not particularly limited, and a vinyl chloride homopolymer or a conventional copolymer resin mainly comprising vinyl chloride can be employed in this invention.

The spherical vinyl chloride resin granules according to the present invention are not limited in size as long as they are spherical, but the upper limit of the diameter is about 1000 μm. From the standpoint of particle characteristics, the proportion of particles having a diameter of 20 μm or more is preferably at least 60% by weight based on the total mass of particles. More preferably, the proportion of those having a diameter of 40 μm or more is at least 70% by weight based on the total mass.

Comonomers in a copolymer resin mainly comprising vinyl chloride which can be used in the present invention include alpha-olefins, e.g., ethylene, propylene, and butylene; vinyl carboxylates, e.g., vinyl acetate, vinyl benzoate, and vinyl stearate; halogenated vinylidenes, e.g., vinylidene chloride; acrylic or methacrylic esters with an alcohol having from 1 to 20 carbon atoms, e.g., methyl methacrylate, methyl acrylate, ethyl acrylate, butyl acrylate, 2-ethylhexyl acrylate, and lauryl acrylate; acrylic or methacrylic esters with benzyl alcohol or a halo- or nitro-substituted benzyl alcohol, e.g., benzyl acrylate and 2-chlorobenzyl acrylate; ethylenically unsaturated monocarboxylic acids, e.g., acrylic acid and methacrylic acid; ethylenically unsaturated dicarboxylic acids, anhydrides thereof, or mono- or dialkyl esters thereof with an alcohol having from 1 to 20 carbon atoms, e.g., aconitic acid, fumaric acid, maleic acid, iraconic acid, citraconic acid, maleic anhydride, dibutyl fumarate, and monoethyl maleate; ethylenically unsaturated carboxylic acid amides, e.g., acrylamide and methacrylamide; ethylenically unsaturated carboxylic acid nitriles, e.g., acrylonitrile and methacrylonitrile; vinylpyrrolidones, e.g., N-vinyl-2-pyrrolidone; alkyl vinyl ethers having from 1 to 20 carbon atoms in the alkyl moiety thereof, e.g., methyl vinyl ether, ethyl vinyl ether, and stearyl vinyl ether; dienes, e.g., isoprene and butadiene; vinyl phosphonates, e.g., bis(2-chloroethyl)vinyl phosphonate; and other vinyl monomers copolymerizable with vinyl chloride. Among these comonomers, vinyl acetate is particularly suitable for preparing an aqueous dispersion such as an emulsion. The vinyl chloride content in the copolymer resins is preferably not less than 80% by weight, more preferably from 90 to 95% by weight.

The granular resin according to the present invention can be produced by a process comprising drying and granulating an aqueous dispersion of a vinyl chloride resin for paste molding in a spray dryer, the aqueous dispersion being obtained by suspension polymerization or emulsion polymerization of vinyl chloride or a monomer mixture mainly comprising vinyl chloride in the presence of a surface active agent.

The surface active agent which can be used for polymerization is not particularly restricted and includes general anionic or nonionic surface active agents.

Examples of suitable anionic surface active agents are alkyl sulfonates, alkylsulfates, alkyl carbonates, alkyl phosphates, alkyl succinates, polyoxyethylene alkylsulfates, and polyoxyethylene alkylarylsulfates. Examples of suitable nonionic surface active agents are polyoxyethylene alkyl ethers, polyoxyethylene alkylaryl ethers, sorbitan fatty acid esters, polyoxyethylene sorbitan fatty acid esters, and polyoxyethylene fatty acid esters.

The aqueous dispersion to be spray dried is not limited in concentration and usually has a concentration of from about 20 to 65% by weight, preferably from about 40 to 60% by weight.

In the preparation of the aqueous dispersion, a polymerization initiator is used in an amount of from about 0.01 to 5% by weight based on the monomer or monomer mixture. Examples of polymerization initiators which can be used for suspension polymerization include oil-soluble compounds such as peroxy dicarbonate, e.g., diethylperoxy dicarbonate, di-2-ethylhexyldiperoxy dicarbonate, di-2-ethoxyethylperoxy dicarbonate, diisopropylperoxy dicarbonate, and diisobutylperoxy dicarbonate; diacyl peroxides, e.g., benzoyl peroxide, p-chlorobenzoyl peroxide, 2,4-dichlorobenzoyl peroxide, octanoyl peroxide, decanoyl peroxide, lauroyl peroxide, and 3,5,5-trimethylhexanoyl peroxide; and azo compounds, e.g., azobisisobutyronitrile and azobisvaleronitrile. Examples of polymerization initiators which can be used for emulsion polymerization include water-soluble compounds, such as ammonium, sodium or potassium persulfate, hydrogen peroxide, and redox polymerization initiator systems comprising a persulfate and an alkali metal bisulfate, a thiosulfate or hydrosulfite.

The spray dryer which can be used for drying and granulation of the thus prepared aqueous resin dispersion is not particularly limited and includes various types of spray dryers commonly employed. Examples of suitable spray dryers are illustrated in, e.g., K. Masters, *Spray Drying Handbook* (3rd Ed.), p. 121, FIG. 4.10, George Godwin Limited (1979).

The aqueous vinyl chloride resin dispersion is first atomized by an atomizer provided in the spray dryer and then dried to produce spherical granules, which are then taken out of the system.

When the resulting granules are for paste molding, the higher the drying temperature, the longer the time required for dispersing the granules in a plasticizer. It is hence desirable for obtaining spherical vinyl chloride resin granules suitable for paste that drying and granulation in a spray dryer is carried out by using drying air having an absolute humidity of from 0,008 to 0.012 kg/kg while controlling the drying air temperature at 100° C. to 60° C., at the inlet of the dryer and, preferably at 50° C. to 40° C. at the outlet of the dryer. The drying air temperature at the inlet or outlet of the dryer can be measured with an ordinary thermometer. The absolute humidity of the drying air can be measured with a ceramic hygrometer, e.g., Model 6802 manufactured by Nippon Canomax K.K.

Drying air having an absolute humidity of less than 0.008 kg/kg might be favorable from the viewpoint of drying efficiency but the granules obtained have deteriorated sol-forming properties. On the other hand, if in using drying air having an absolute humidity of more than 0.012 kg/kg, the resulting granules contain a considerable amount of water. A sol prepared from such granules has a high water content and also fails to exhibit satisfactory characteristics as desired, only provides final products of poor quality, such as films of poor surface smoothness.

If the drying air temperature exceeds 100° C. at the inlet or exceeds 50° C. at the outlet, the time required for the resulting granules to be dispersed in a plasticizer for paste becomes longer.

Taking only the time for dispersing granules in a plasticizer into account, a lower drying temperature is preferred, but the amount of air required for drying would be so increased. When, in particular, the drying air has a high humidity, the water content remaining in the granules becomes high, making it difficult to obtain a sol having satisfactory characteristics. Therefore, it is preferable to avoid an excessive lowering of drying air temperature.

Since the thus obtained granules do not withstand heat and tend to undergo a deterioration of sol-forming properties if exposed to a high temperature atmosphere, it is preferable that the granules should not remain in a spray dryer for a long time, for example for 4 hours or more at 50° C., in order to obtain granules having satisfactory sol-forming properties.

The parts of a spray dryer which the granules contact during drying and granulation typically include the inner surface of a conical section in the lower part of the spray dryer, the upper wall of the dryer, and the side wall of the dryer. In the present invention, it is preferable that the surface of at least the conical section is finished by buffing with a buff #100 or finer. The conical section of a spray dryer functions to collect dried granules in its bottom and to discharge them out of the dryer. With a surface smoothness of #100 or finer, adhesion of granules to the conical section can be reduced, i.e., the amount of granules which are exposed to heat for a long time, can be decreased, thereby improving sol-forming properties of the collected granules.

In addition to the buffing of the inner surface of the conical section, etc., a reduction in the adherence of granules to the spray dryer, to obtain a further improvement in sol-forming properties of the resulting granules, can be assured by utilizing conventional techniques for removing granules adhered to the inner wall of a spray dryer, such as causing the dryer body to vibrate, directing an air jet stream onto the inner wall of the dryer, and the like.

The granules obtained from the aqueous resin dispersion preferably have an average particle size that does not cause any problems when finely ground and that also exhibits satisfactory sol-forming properties, i.e., an average particle size of from 30 to 100 $\mu$m, preferably from 40 to 60 $\mu$m.

Since the spherical vinyl chloride granules according to the present invention have satisfactory flow characteristics because of their spherical shape, unlike the conventional vinyl chloride granules, they can be easily transported by pneumatic conveying or by a tank truck; they can be automatically weighed and fed during use; and also they have a high bulk specific gravity and an increased weight per unit volume, thereby reducing transportation costs. Further, because the spherical vinyl chloride resin granules of the present invention are usable as they are for paste molding, the problems associated with the conventional finely ground vinyl chloride resin powder for paste, i.e., deterioration of a working environment due to dusting and inapplicability to automatic weighing and feeding, can be avoided.

Where the spherical vinyl chloride resin granules of the present invention are used as a paste molding material, even when they do not have sufficient sol-forming properties and need to be ground before sol formation, troubles that might be involved in the step of obtaining ground particles and the cost that might be incurred therefor can be reduced owing to the above-described flow characteristics and transportability, thus making it feasible to adopt an advanced automatic system.

For the spherical vinyl chloride resin granules of the present invention to exhibit sufficient sol-forming properties for use in preparation of paste as they are, it is preferable that the granules have a diameter of not greater than 200 $\mu$m, with the proportion of those having a diameter of 20 $\mu$m or more, more preferably 40 $\mu$m or more, most preferably 50 $\mu$m or more, being at least 60%, more preferably at least 70%, and most preferably at least 90%, by weight based on the total mass of particles. This condition of size distribution being satisfied, the granules roll, or flow, easily have satisfactory particle characteristics exemplified by their angle of repose, and do not give rise to problems in automatic weighing and feeding. Because they have not been finely ground, the proportion of fine powders which may cause deterioration of the working environment due to dusting can be decreased. In general, with the above-described size distribution condition being met, the angle of repose, an indication of particle characteristics, falls within a range of from 30° to 38° (the method of measuring an angle of repose will be given hereinafter).

In general, spherical granules having a large size are preferred from the viewpoint of improving particle characteristics, while those having a small size are preferred from the viewpoint of improving sol-forming properties. In this connection, as long as the above-stated size distribution requirement is fulfilled, the granules satisfy both particle characteristics and sol-forming properties.

The spherical vinyl chloride resin granules of the invention preferably have a moisture Content of from about 0.01 to 1% by weight. In particular, when the granules are used for paste molding, a moisture content of from about 0.1 to 0.5% by weight is preferred. Granules having a moisture content less than about 0.1% by weight have reduced sol-forming properties. Granules having a water content of greater than about 0.5% by weight provide a sol having a high moisture content which is apt to adversely affect the viscosity of the sol, or the resulting sol produces final products of poor quality, e.g., poor surface smoothness. Hence, drying of the aqueous resin dispersion is preferably carried out so that the resulting granules have the above-recited moisture content thereby stably producing granules having excellent sol-forming properties. The moisture content of the granules can be measured using a Karl Fischer moisture meter or an infrared moisture meter.

As stated above, the granular vinyl chloride resin for paste according to the present invention exhibits excellent sol-forming properties. The terminology "excellent sol-forming properties" as used herein means that the granules, when mixed with a plasticizer, form a sol in which agglomerates or lumps of undispersed granules have a diameter of not more than 60 μm as determined by the method described below.

As long as the diameter of lumpy agglomerates in the sol is 60 μm or smaller, the sol provides final products, e.g., wall paper, floor coverings, etc., substantially free from surface defects, such as fish-eyes, and have satisfactory quality.

The spherical granules preferably have an average particle size of 20 μm or greater from the view, point of improving particle characteristics and preferably have an average particle size of 100 μm or smaller from the view, point of ease in drying and improving sol-forming properties. The average particle size falling within this range, the granules satisfy both particle characteristics and drying properties.

The inventors have continued their studies and, as a result, found that the properties of an aqueous dispersion which is dried and granulated for obtaining vinyl chloride resin granules for paste molding have great influences on qualities of final products obtained by paste molding or workability during molding in the following manner.

1) The aqueous dispersion of a vinyl chloride resin partly contains agglomerates. The agglomerates disappear upon stirring, but again partly appear in the aqueous dispersion when the aqueous dispersion is left to stand.
2) Granules obtained from the vinyl chloride resin aqueous solution containing agglomerates have poor sol-forming properties. The sol-forming properties are further degraded when the granules are preserved.
3) Granules obtained from a vinyl chloride resin aqueous solution from which agglomerates have disappeared by stirring exhibit satisfactory sol-forming properties and, in addition, do not undergo deterioration in sol-forming properties even when preserved.

It is hence necessary that a vinyl chloride resin aqueous solution should be agitated and then supplied to a spray drier without delay, and drying and granulation should be completed in a short time. That is, it has been found that a granular vinyl chloride resin for paste having incomparably excellent properties can be obtained by supplying a vinyl chloride resin aqueous solution to a spray drier with strong agitation at an output of at least 100 W per kilogram of the aqueous dispersion.

The aqueous dispersion of a vinyl chloride resin for paste is not particularly limited, being similar to conventional aqueous dispersions for preparing a vinyl chloride resin for paste.

The aqueous dispersion is supplied to a spray drier with strong agitation at an output of at least 100 W per kilogram of the aqueous dispersion.

By strongly agitating the aqueous dispersion to be supplied to a spray drier, agglomerates which have been partly present in the aqueous dispersion are reduced. Since the aqueous dispersion is spray dried under such a state, granules obtained provide a sol having a reduced content of coarse particles.

The above-described aqueous dispersion has a property that agglomeration reversibly occurs at a temperature of 70° to 80° C. or higher. If the agitation intensity is higher than 1000 W/kg-aqueous dispersion, the temperature of the aqueous dispersion rises in a short time whereby the aqueous dispersion readily undergoes reversible agglomeration. In order to prevent temperature rise, it is possible, though not efficient, to agitate while cooling.

It is preferable that the aqueous dispersion be supplied to a spray drier within 5 minutes from the agitation.

Apparatus which can be used for agitation are not particularly limited and include, for example, a general paddle agitator, a propeller agitator, a turbine agitator, a high-speed rotary homogenizer, and ultrasonic homogenizer.

Spray driers which can be used for drying and granulation of the thus conditioned aqueous dispersion are not particularly limited, and any of commonly used spray driers can be employed. There is also no limitation to drying conditions.

The present invention is now illustrated in greater detail by way of the following Examples and Comparative Examples, but it should be understood that the present invention is not deemed to be limited thereto. Unless otherwise indicated, all the percentages, parts, and ratios are by weight.

In these Examples, characteristics of the vinyl chloride resin granules obtained were evaluated in terms of sol-forming properties, average particle size, angle of repose, and preservability according to the following methods.

1) Sol-Forming Properties 1-a) Size of Undispersed Agglomerates in Sol

In a 5 liter-volume Hobart mixer (Model 5DMV, manufactured by Shinagawa Kogyosho) were charged 500 g of granules and 325 g of dioctyl phthalate, and the mixture was mixed by stirring at 25° C. for 10 minutes using a hook propeller at 141 rpm (rotation) and 67 rpm (revolution) to prepare a sol. The size of the undispersed agglomerates in the sol was measured using a grindometer according to JIS K5400 "General Test Method of Coating-4.4 Test of Grains" and evaluated by the A Scale. More specifically, the sol was cast in a groove of the grindometer whose depth continuously decreases from 25 μm to 0 μm and scraped with a scraper blade. The position where a streak line due to undispersed agglomerate appeared was read to estimate the diameter of the agglomerate.

1-b) Number of Undispersed Agglomerates in Film

The sol sample as used in 1-a) above was spread on a glass plate using a film applicator having a clearance of 152 μm, and the coat was gelled in an oven at 200° C. for 4 minutes to form a film. A 3 cm×3 cm piece was cut out of the film, and fish-eyes were counted by visual observation.

2) Average Particle Size of Granule

An average particle size was measured using a sieve for granules of 100 μm or greater and using a Coulter Counter for smaller granules.

3) Angle of Repose

The angle of repose measured with a powder tester manufactured by Hosokawa Funtai Kogaku Kenkyusho.

4) Dustring Properties

Twenty grams of granules were put into a 100 cc-volume glass-made sample tube provided with a stopper. The tube was stopped and shaken for 30 seconds at a frequency of 10 times per 5 seconds with an amplitude of about 20 cm. The stopper was removed, and dusting from the tube was visually observed.

5) Preservability

The granules were preserved in a thermostat at 30° C. for 3 months, and then the sol-forming properties were evaluated in the same manner as in 1-a) and 1-b) above.

EXAMPLES 1 TO 3

An aqueous dispersion having a solids content of 47% and containing 100 parts of a vinyl chloride resin and 1.0 part of sodium laurylsulfate was dried and granulated using a spray dryer (tower diameter: 2.75 m; tower length: 3.0 m in cylindrical section, 2.2 m in conical section; angle of conical section: 60°) having a rotating disc atomizer (diameter: 8.4 cm). The number of revolution of the rotating disc was set at 18000 rpm (Example 1), 16000 rpm (Example 2) or 5000 rpm (Example 3). Air which had been passed through a dehumidifier so as to have an absolute humidity of 0.01 kg/kg and then heated to 80° C. was fed to the spray dryer. The amount of the drying air was controlled so that the temperature at the outlet was 45° C. Other conditions for spray drying and the results of evaluation on the resulting granules are shown in Table 1 below.

Figure 1:
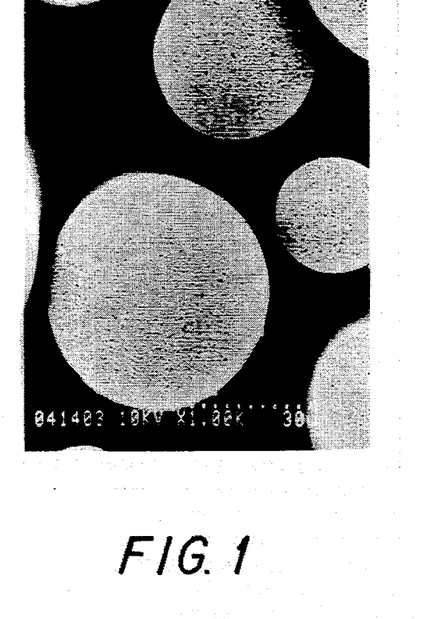
FIG. 1 is an electron photomicrograph (about 900× magnification) showing the granular structure of spherical vinyl chloride resin-granules obtained in Example 1 according to the present invention.

The granules obtained in Examples 1 to 3 were confirmed to be spherical by electron microscopic observation (about 900× magnification). The electron photomicrograph of the granules obtained in Example 1 is shown in FIG. 1.

COMPARATIVE EXAMPLE 1

Granules were produced in the same manner as in Example 1, except for changing the number of revolutions of the rotating disc to 22000 rpm. The results of evaluation are shown in Table 1 below. It can be seen from the table that the angle of repose was considerably increased to 40°.

Figure 2:
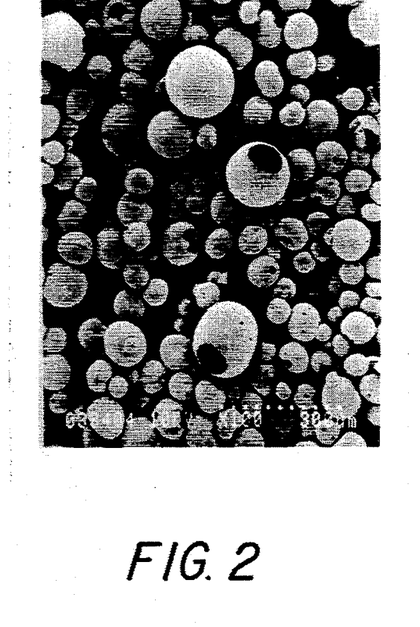
FIG. 2 is an electron photomicrograph (about 130× magnification) showing the granular structure of non-spherical vinyl chloride resin granules obtained in Example 1.

Electron microscopic observation (about 130× magnification) revealed that the resulting granules were not spherical as shown in FIG. 2.

COMPARATIVE EXAMPLE 2

The spherical granules obtained in Example 1 were ground and evaluated. The results obtained are shown in Table 1 below. As is apparent from the table, the resulting particles were inferior to the granules of Examples 1 through 5 in angle of repose and dusting properties.

Figure 3:
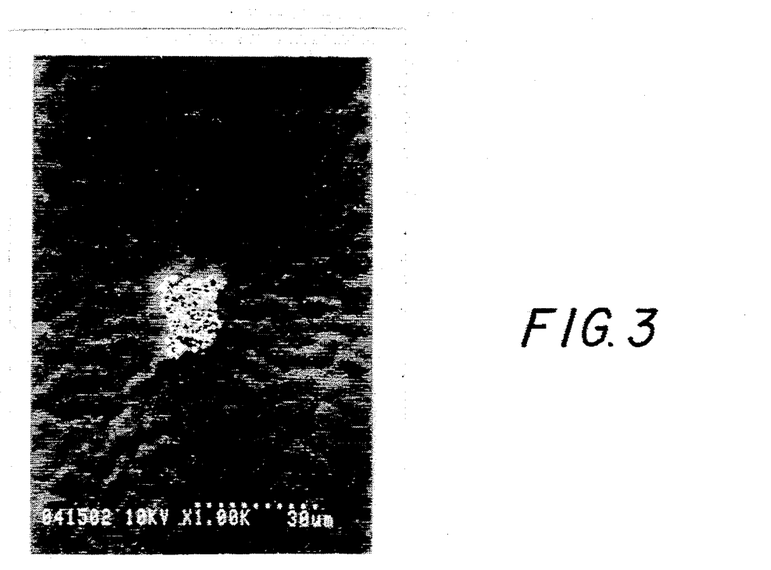
FIG. 3 is an electron photomicrograph (about 900× magnification) showing the particulate structure of vinyl chloride resin having an angle of repose of 50° obtained in Comparative Example 2 by grinding the spherical granules of Example 1.

The electron photomicrograph (about 900× magnification) of the particles is shown in FIG. 3.

TABLE 1

|  | Example 1 | Example 2 | Example 3 | Comparative Example 1 | Comparative Example 2 |
|---|---|---|---|---|---|
| Drying Condition: | | | | | |
| Number of Revolutions of Rotating Disc (rpm) | 18000 | 16000 | 5000 | 22000 | 18000 |
| Granule Characteristics: | | | | | |
| Average Particle Size (μm) | 38 | 50 | 100 | 20 | * |
| Percent of Granules of 20 μm or Greater (%) | 88 | 95.5 | 99.5 | 50 | 5 |
| Percent of Granules of 40 μm or Greater (%) | 52 | 65 | 96 | 10 | 1 |
| Angle of Repose (°) | 37 | 33 | 32 | 40 | 50 |
| Dusting | not observed | not observed | not observed | observed | observed |
| Bulk Specific Gravity (loose packing) (g/cc) | 0.56 | 0.55 | 0.56 | 0.49 | 0.31 |
| Moisture Content (%) | 0.20 | 0.21 | 0.40 | 0.20 | 0.20 |

EXAMPLE 4

An aqueous dispersion having a solids content of 47% and containing 100 parts of a vinyl chloride resin for paste and 1.0 part of sodium dodecylbenzenesulfonate was dried and granulated using a spray dryer (tower diameter: 2.75 m; tower length: 3.0 m in cylindrical section, 2.2 m in conical section; angle of conical section: 60°) having a rotating disc atomizer (diameter: 8.4 cm). The number of revolutions of the rotating disc was set at 12000 rpm. Air which had been passed through a dehumidifier so as to have an absolute humidity of 0.01 kg/kg and then heated to 80° C. was fed to the spray dryer. The amount of the drying air was controlled so that the temperature at the outlet was 45° C. Other conditions for spray drying and the results of evaluation on the resulting granules are shown in Table 2 below. The water content of the granules was determined using a Karl Fischer moisture meter (Model MKA-3P, manufactured by Kyoto Denshi Kogyo K.K.). The humidity of the drying air was determined using Model 6802 manufactured by Nippon Canomax K.K.

EXAMPLE 5

Granules were produced in the same manner as in Example 4, except for adjusting the absolute humidity of the drying air to 0.012 kg/kg. The results of the evaluation of the granules are shown in Table 2 below.

COMPARATIVE EXAMPLE 3

Granules were produced in the same manner as in Example 4, except for adjusting the absolute humidity of the drying air to 0.022 kg/kg. The results of the evaluation of the granules are shown in Table 2 below.

As can be seen from the results in Table 2, the water content of the granules exceeded 1%. The size of the undispersed agglomerates in the sol prepared from the granules was unmeasurable because the sol did not form a smooth layer when spread on a grindometer. Film formation from the sol resulted in a failure to obtain a normal film apparently because the water contained in the sol was evaporated during heating.

COMPARATIVE EXAMPLE 4

Granules were produced in the same manner as in Example 4, except for adjusting the absolute humidity of the drying air to 0.006 kg/kg. The results of the evaluation of the granules are shown in Table 2 below.

EXAMPLE 7

Granules were produced in the same manner as in Example 4, except for adjusting the drying air temperature to 90° C. and 45° C. at the inlet and outlet, respectively. The results of the evaluation of the granules are shown in Table 3 below.

COMPARATIVE EXAMPLE 5

Granules were produced in the same manner as in Example 4, except for adjusting the drying air temperature to 110° C. and 55° C. at the inlet and outlet, respectively. The results of the evaluation of the granules are shown in Table 3 below.

TABLE 2

|  | Example 4 | Example 5 | Comparative Example 3 | Comparative Example 4 |
|---|---|---|---|---|
| Drying Conditions: |  |  |  |  |
| Absolute Humidity of Drying Air (kg/kg) | 0.01 | 0.012 | 0.022 | 0.006 |
| Drying Air Temperature at the Inlet (°C.) | 80 | 80 | 80 | 80 |
| Drying Air Temperature at the Outlet (°C.) | 45 | 45 | 45 | 45 |
| Amount of Drying Air (Nm³/hr) | 880 | 880 | 880 | 880 |
| Aqueous Dispersion Feed (kg/hr) | 30 | 30 | 30 | 30 |
| Number of Revolutions of Rotating Disc (rpm) | 12000 | 12000 | 12000 | 12000 |
| Granule Characteristics: |  |  |  |  |
| Moisture Content (%) | 0.12 | 0.45 | 1.05 | 0.08 |
| Average Particle Size (μm) | 45 | 45 | 45 | 45 |
| Angle of Repose (°) | 33 | 32 | 32 | 33 |
| Sol-Forming Properties: |  |  |  |  |
| Size of Undispersed Agglomerates in Sol (μm) | 25 | 25 | * | 80 |
| Number of Undispersed Agglomerates in Film | 0 | 0 | ** | 50 |

Note:
*: Unmeasurable because the sol did not form a smooth layer on a grindomter.
**: A normal film was not formed.

It can be seen from the results in Table 2 that the size of undispersed agglomerates in the sol can be controlled below 50 μm and a film free from lumpiness can be obtained by adjusting the absolute humidity of the drying air to 0.008 to 0.012 kg/kg. The sol of Comparative Example 4 turned out to have a considerably increased number of undispersed particles as compared with that of Example 4.

EXAMPLE 6

Granules were produced in the same manner as in Example 4, except for adjusting the drying air temperature to 70° C. and 40° C. at the inlet and outlet, respectively.

COMPARATIVE EXAMPLE 6

Granules were produced in the same manner as in Example 4, except for adjusting the drying air temperature to 80° C. and 55° C. at the inlet and outlet, respectively. The results of the evaluation of the granules are shown in Table 3 below.

COMPARATIVE EXAMPLE 7

Granules were produced in the same manner as in Example 4, except for adjusting the drying air temperature to 110° C. and 45° C. at the inlet and outlet, respectively. The results of the evaluation of the granules are shown in Table 3 below.

TABLE 3

|  | Example 6 | Example 7 | Comparative Example 5 | Comparative Example 6 | Comparative Example 7 |
|---|---|---|---|---|---|
| Drying Conditions: |  |  |  |  |  |
| Absolute Humidity of Drying Air (kg/kg) | 0.01 | 0.01 | 0.01 | 0.01 | 0.01 |
| Drying Air Temperature at the Inlet (°C.) | 70 | 90 | 100 | 80 | 110 |
| Drying Air Temperature at the Outlet (°C.) | 40 | 45 | 55 | 55 | 45 |
| Amount of Drying Air (Nm³/hr) | 1280 | 850 | 940 | 1500 | 510 |
| Aqueous Dispersion Feed (kg/hr) | 30 | 30 | 30 | 30 | 30 |
| Number of Revolutions of Rotating Disc (rpm) | 12000 | 12000 | 12000 | 12000 | 12000 |
| Granule Characteristics: |  |  |  |  |  |
| Moisture Content (%) | 0.22 | 0.21 | 0.20 | 0.20 | 0.21 |
| Average Particle Size (μm) | 45 | 45 | 45 | 45 | 45 |
| Angle of Repose (°) | 33 | 33 | 33 | 33 | 33 |
| Sol-Forming Properties: |  |  |  |  |  |
| Size of Undispersed Agglomerates in Sol (μm) | 25 | 30 | 100 | 85 | 100 |
| Number of Undispersed Agglomerates in Film | 0 | 1 | more than 100 | more than 100 | more than 100 |

It can be seen from the results in Table 3 that the size of undispersed agglomerates in the sol can be controlled below 50 μm and a film substantially free from lumpiness can be obtained by adjusting the drying air temperatures at the inlet and outlet to 100° C. or less and 50° C. or less, respectively.

EXAMPLE 8

Granules were produced in the same manner as in Example 4, except for using an aqueous dispersion of a vinyl chloride resin for paste molding having a solids content of 49% and containing 1 part of sodium laurylsulfate per 100 parts of the vinyl chloride resin and setting the number of revolutions of the rotating disc at 8000 rpm. The results of the evaluation of the granules are shown in Table 4 below.

COMPARATIVE EXAMPLE 8

Granules were produced in the same manner as in Example 8, except for setting the number of revolutions of the rotating disc at 22000 rpm. The results Of the evaluation of the granules are shown in Table 4 below.

COMPARATIVE EXAMPLE 9

Granules were produced in the same manner as in Example 8, except for setting the number of revolution of the rotating disc at 6000 rpm. The results of the evaluation of the granules are shown in Table 4 below.

TABLE 4

|  | Example 8 | Comparative Example 8 | Comparative Example 9 |
|---|---|---|---|
| Drying Conditions: | | | |
| Absolute Humidity of Drying Air (kg/kg) | 0.01 | 0.01 | 0.01 |
| Drying Air Temperature at the Inlet (°C.) | 80 | 80 | 80 |
| Drying Air Temperature at the Outlet (°C.) | 45 | 45 | 45 |
| Amount of Drying Air (Nm³/hr) | 880 | 880 | 880 |
| Aqueous Dispersion Feed (kg/hr) | 30 | 30 | 30 |
| Number of Revolutions of Rotating Disc (rpm) | 8000 | 22000 | 6000 |
| Granule Characteristics: | | | |
| Moisture Content (%) | 0.22 | 0.20 | 0.73 |
| Average Particle Size (μm) | 60 | 25 | 80 |
| Angle of Repose (°) | 35 | 40 | 32 |
| Sol-Forming Properties: | | | |
| Size of Undispersed Agglomerates in Sol (μm) | 35 | 20 | 70 |
| Number of Undispersed Agglomerates in Film | 0 | 0 | 10 |

The results of Example 8 shown in Table 4 reveal that the granules according to the present invention have a small angle of repose and are therefore easy to handle.

In the field of particle technology, an angle of repose is often used as an indication of ease of handling particles. Noting the fact that the angle of repose of vinyl chloride resin particles which can be used in an automatic feeding system is not more than 35°, the vinyl chloride granules for paste molding obtained in the Examples are recognized to have satisfactory particle characteristics as long as they have an angle of repose of 35° or less.

EXAMPLES 9, 10 AND 12

Granules were produced in the same manner as in Example 1, except for setting the number of revolutions of the rotating disc at 10000 rpm (Example 9), 14000 rpm (Example 10) or 22000 rpm (Example 12). The results of the evaluation of the granules are shown in Table 5 below.

Art electron photomicrograph showing the structure of the granules obtained in each of Examples 9 and 10 is shown similar to in FIG. 1 (about 900× magnification) and FIG. 2 (about 130× magnification), respectively.

EXAMPLE 11

Granules were produced in the same manner as in Example 9, except for setting the number of revolutions of the rotating disc at 7000 rpm and adjusting the drying air temperature at the inlet and the outlet to 90° C. and 48° C., respectively. The results of the evaluation of the granules are shown in Table 5.As can be seen from the results, the resulting granules had an increased average particle size while the size of the undispersed agglomerates in the sol prepared therefrom did not undergo a substantial increase.

COMPARATIVE EXAMPLE 10

Granules were produced in the same manner as in Example 9, except for adjusting the drying air temperature at the inlet and the outlet to 120° C. and 55° C., respectively. The results of evaluation are shown in Table 5 below. Although the angle of repose of the resulting granules was equal to that of Example 9, the sol prepared therefrom contained undispersed agglomerates of larger size.

COMPARATIVE EXAMPLE 11

The granules obtained in Example 11 were classified using a 145 mesh sieve (mesh size: 105 μm) to obtain granules of large size. As is shown in Table 5 below, the sol prepared therefrom contained undispersed agglomerates larger than those of Example 11.

TABLE 5

|  | Example 9 | Example 10 | Example 11 | Example 12 | Comparative Example 10 | Comparative Example 11 |
|---|---|---|---|---|---|---|
| Drying Conditions: | | | | | | |
| Number of Revolutions of Rotating Disc (rpm) | 10000 | 14000 | 7000 | 22000 | 10000 | — |
| Drying Air Temperature at the Inlet (°C.) | 80 | 80 | 90 | 80 | 120 | — |
| Drying Air Temperature at the Outlet (°C.) | 45 | 45 | 48 | 45 | 55 | — |
| Granule Characteristics: | | | | | | |
| Moisture Content (%) | 0.12 | 0.45 | 0.15 | 0.15 | 0.15 | 0.18 |

TABLE 5-continued

|  | Example 9 | Example 10 | Example 11 | Example 12 | Comparative Example 10 | Comparative Example 11 |
| --- | --- | --- | --- | --- | --- | --- |
| Average Particle Size (μm) | 45 | 36 | 80 | 30 | 45 | — |
| Angle of Repose (°) | 33 | 34 | 32 | 38 | 33 | 32 |
| Size Distribution: | | | | | | |
| Ratio of Granules greater than 100 μm (%) | 8.2 | 3.3 | 35.0 | 1.5 | 9.0 | 80 |
| Ratio of Granules greater than 20 μm (%) | 5.2 | 9.1 | 0.5 | 40 | 4.0 | 0 |
| Dusting | not observed | not observed | not observed | observed | not observed | not observed |
| Sol-Forming Properties: | | | | | | |
| Size of Undispersed Agglomerates in Sol (μm) | 50 | 45 | 55 | 40 | 100 | 70 |
| Number of Undispersed Agglomerates in Film | 0 | 0 | 0 | 0 | 40 | 10 |

COMPARATIVE EXAMPLE 12

An aqueous dispersion of a vinyl chloride resin for paste molding having a solids content of 47% was dried and granulated using a rotating disc type spray dryer whose inner wall was finished according to JIS G4305, No. 2B (tower diameter: 2.75 m; tower length: 3.0 m in cylindrical section, 2.2 m in conical section; angle of conical section: 60°) at a temperature of 80° C. at the inlet and 45° C. at the outlet. During the drying, an air hammer fixed to the dryer body was put in motion at a frequency of once per 20 seconds.

After completion of the drying, the inside of the dryer was observed to find a large quantity of granules adhering to the inner wall of the conical section. By microscopic observation of a part of the adhering granules, lumps comprising several granules were found in places. Such lumps were also present in the collected granules in a proportion of 2% or more. Other drying conditions and particle characteristics and sol-forming properties of the resulting granules are shown in Table 6 below.

EXAMPLE 13

Granules were produced in the same manner as in Comparative Example 12, except for using a spray dryer whose conical section was finished with a buff #240.

After completion of the drying, no substantial adhesion of granules onto the inner wall of the conical section was observed. The results of evaluation are shown in Table 6 below.

TABLE 6

|  | Example 13 | Comparative Example 12 |
| --- | --- | --- |
| Drying Condition: | | |
| Absolute Humidity of Drying Air (Kg/Kg) | 0.01 | 0.01 |
| Drying Air Temperature at the Inlet (°C.) | 80 | 80 |
| Drying Air Temperature at the Outlet (°C.) | 45 | 45 |
| Amount of Drying Air (Nm³/hr) | 880 | 880 |
| Feed of Aqueous Dispersion (kg/hr) | 30 | 30 |
| Granule Characteristics: | | |
| Water Content (%) | 0.22 | 0.22 |
| Average Particle Size (μm) | 45 | 45 |
| Angle of Repose (°) | 33 | 32 |
| Sol-Forming Properties: | | |
| Size of Undispersed Agglomerates in Sol (μm) | 25 | 70 |
| Number of Undispersed Agglomerates in Film | 0 | 10 |

It can be seen from the results of Table 6 that the size of undispersed agglomerates in the sol and the number of undispersed agglomerates in the film were smaller in Example 13 than in Comparative Example 12.

EXAMPLES 14 TO 16 AND COMPARATIVE EXAMPLES 13 AND 14

A drying test was conducted under the same conditions as in Example 13, except that a test piece having a surface finished according to JIS G4305, No. 2D (no buffing), No. 2B (no buffing), buff #100, buff #150, or buff #240 was attached to the inner wall of the conical section of the spray dryer. After the drying, the test piece was removed and observed. As a result, it was found that a large quantity of granules adhered to the test pieces of No. 2D and No. 2B while no adhesion of granules was observed on the test pieces of buff #100, buff #150 and buff #240.

From these results, it can be seen that adhesion of granules to the conical section can be prevented by finishing the surface of the conical section to have a smoothness of buff #100 or finer thereby producing granules having improved sol-forming properties.

EXAMPLE 17

One kilogram of an aqueous dispersion of a vinyl chloride resin for paste molding having a solid content of 47% and containing 1 part of sodium dodecylbenzenesulfonate per 100 parts of a vinyl chloride resin were put in a 1 l-volume stainless beaker and agitated using a high-speed rotary homogenizer (produced by Silverson) at an output of 200 W (average retention time: 120 seconds). The aqueous dispersion was supplied to a spray drier having a rotary disc atomizer (tower diameter: 2.75 m; tower height: 3.0 m in cylindrical section, 2.2 m in conical section; angle of the conical section: 60°) while being agitated. Air which had been passed through a dehumidifier so as to have an absolute humidity of 0.01 kg/kg and then heated to 80° C. was fed to the spray drier. The number of revolution of the rotary disc was 14000 rpm. Other conditions for spray drying and the results of evaluation on the resulting granules are shown in Table 7 below. The water content of the granules was measured using a Karl Fischer moisture meter "MKA-3P" (produced by Kyoto Denshi Kogyo K.K.).

EXAMPLE 18

Granules were produced in the same manner as in Example 17, except that agitation of the aqueous dispersion was carried out using a ultrasonic homogenizer "US-300" (produced by Nippon Seiki Seisakusho) at an output of 150 W (residual retention time: 120 seconds). The results of evaluations are shown in Table 7.

COMPARATIVE EXAMPLE 15

Granules were produced in the same manner as in Example 17, except that the same vinyl chloride aqueous dispersion as used in Example 17 was supplied to a spray drier without agitation. The results of evaluations are shown in Table 7 below.

TABLE 7

|  | Example 17 | Example 18 | Comparative Example 15 |
|---|---|---|---|
| Drying Condition: | | | |
| Absolute Humidity (kg/kg) | 0.01 | 0.01 | 0.01 |
| Drying Air Temp. at the Inlet (°C.) | 80 | 80 | 80 |
| Drying Air Temp. at the Outlet (°C.) | 45 | 45 | 45 |
| Amount of Drying Air (Nm³/hr) | 880 | 880 | 880 |
| Aqueous Dispersion Feed (kg/hr) | 30 | 30 | 30 |
| Granule Characteristics: | | | |
| Moisture Content (%) | 0.22 | 0.22 | 0.22 |
| Average Particle Size (μm) | 45 | 45 | 45 |
| Angle of Repose (°) | 33 | 32 | 32 |
| Sol-Forming Properties: | | | |
| Size of Undispersed Agglomerates in Sol (μm) | 20 | 20 | 70 |
| Number of Undispersed Agglomerates in Film | 0 | 0 | 10 |
| Preservability*: | | | |
| Size of Undispersed Agglomerates in Sol (μm) | 30 | 30 | 90 |
| Number of Undispersed Agglomerates in Film | 2 | 3 | 20 |

Note:
*The moisture content, average particle size, and angle of repose of the granules did not substantially change after preservation.

It can be seen from the results of Table 7 that the sol prepared from the granules of Comparative Example 15 contained large undispersed agglomerates and the film prepared from the sol contained a large number of undispersed agglomerates. Further, the granules of Comparative Example 15 shows a pronounced tendency to undergo deterioration of sol-forming properties when preserved for a long time.

While the invention has been described in detail and with reference to specific embodiments thereof, it will be apparent to one skilled in the art that various changes and modifications can be made therein without departing from the spirit and scope thereof.

What is claimed is:

1. A precursor composition for a vinyl chloride paste molding composition, consisting essentially of spherical granules of vinyl chloride resin having a water content of 0.1–0.5% by weight and an average particle size of 30–100 μm, wherein said granules have an angle of repose of 30°–38°, and the proportion of granules having a particle size of 40 μm or more is at least 70% by weight based on the total mass of the granules, said granules being obtained by a process comprising the steps of:

drying and granulating in a spray dryer an aqueous dispersion of paste vinyl chloride resin obtained by aqueous suspension polymerization or aqueous emulsion polymerization, wherein the drying air in said spray dryer has an absolute humidity of 0,008–0.012 kg/kg, and a temperature not higher than 100° C. at the inlet spray dryer and a temperature not higher than 50° C. at the outlet of the spray dryer wherein a sol is formed wherein undispersed spherical granules of vinyl chloride resin have a diameter of 60 μm or less when 500 g of said precursor composition is mixed with 325 g of dioctyl phthalate, and at 25° C. for 10 minutes using a hook propeller at 141 rpm rotation and 67 rpm revolution.

* * * * *